UNITED STATES PATENT OFFICE.

WALTER BEACALL BISHOP, ALFRED BISHOP, AND FRANCIS WILLIAM PASSMORE, OF LONDON, ENGLAND; SAID PASSMORE ASSIGNOR TO SAID WALTER BEACALL BISHOP AND ALFRED BISHOP.

PIPERIDIN SALT AND PROCESS OF MAKING SAME.

SPECIFICATION forming part of Letters Patent No. 717,066, dated December 30, 1902.

Application filed June 3, 1902. Serial No. 110,121. (No specimens.)

*To all whom it may concern:*

Be it known that we, WALTER BEACALL BISHOP and ALFRED BISHOP, manufacturing chemists, of 48 Spelman street, and FRANCIS WILLIAM PASSMORE, consulting chemist, of 63 Queen Victoria street, London, England, have invented a certain new and useful Manufacture of an Improved Salt of Piperidin, of which the following is a specification.

The present invention relates to the manufacture of an improved salt of piperidin.

The medicinal employment of piperidin is restricted by the liquid caustic and strong-smelling characters of the base. On the other hand, the number of salts of piperidin at present known which lend themselves to therapeutical purposes is very limited. Most of the salts formed by piperidin with suitable acids are either non-crystalline or decompose by heating or even in a moist atmosphere.

We have discovered that piperidin forms a very staple salt with para-sulphamin benzoic acid, this salt being crystalline and non-hygroscopic, while it is not dissociated by the heat of the water-bath and is therefore particularly suitable for the preparation of effervescent preparations of piperidin.

Our invention consists in the manufacture or production of this new salt or analogous salts by causing para-sulphamin benzoic acid to react with piperidin under such conditions as to form a neutral salt.

In carrying the invention into effect we may, for example, prepare the new salt of piperidin by dissolving one part, by weight, piperidin in five parts of water and adding about two parts, by weight, finely-powdered para-sulphamin benzoic acid, warming until dissolved, adding a further small quantity of the acid, if necessary, for complete neutralization, and allowing to cool. The salt easily crystallizes out and is filtered off. A further batch of crystals may be obtained by evaporation of the filtrate. The crystals may be purified by recrystallization from alcohol.

The new salt para-sulphamin benzoate of piperidin is a white crystalline powder corresponding to the formula

$$C_6H_4.SO_2NH_2.COOH.C_5H_{11}N$$

and has a melting-point of about 228° centigrade. It is readily soluble in cold water and also in boiling alcohol; less so in cold alcohol.

What we claim, and desire to secure by Letters Patent, is—

1. The process of obtaining a staple salt from piperidin by causing about one part by weight of piperidin to react with about two parts by weight of para-sulphamin benzoic acid and then allowing the salt to crystallize.

2. The process of obtaining a staple salt from piperidin by causing about one part by weight of piperidin to react with about two parts by weight of para-sulphamin benzoic acid in aqueous solution, under sufficient heat to effect solution, and then allowing the salt to crystallize out.

3. As a new article of manufacture, para-sulphamin benzoate of piperidin, having the chemical constitution corresponding to the formula $C_6H_4.SO_2NH_2.COOH.C_5H_{11}N$ and being a white crystalline powder having a melting-point of or about 228° centigrade.

In witness whereof we have hereunto signed our names in the presence of two subscribing witnesses.

WALTER BEACALL BISHOP.
ALFRED BISHOP.
FRANCIS WILLIAM PASSMORE.

Witnesses to the signature of Walter Beacall Bishop:
JOSEPH LAKE,
W. J. NORWOOD.

Witnesses to the signatures of Alfred Bishop and Francis William Passmore:
THOMAS LAING WHITEHEAD,
OSCAR ALFRED BISHOP.